United States Patent Office 3,729,305  
Patented Apr. 24, 1973

3,729,305  
HERBICIDAL METHOD EMPLOYING TRIFLUOROMETHYLPHENYLACETIC ACID AND AMIDES THEREOF  
Wilbur J. Doran, Indianapolis, Ind., assignor to Eli Lilly and Company, Indianapolis, Ind.  
No Drawing. Continuation-in-part of application Ser. No. 756,366, Aug. 30, 1968, which is a continuation-in-part of application Ser. No. 531,041, Mar. 2, 1966, both now abandoned. This application Nov. 14, 1969, Ser. No. 877,005  
Int. Cl. A01n 9/20  
U.S. Cl. 71—115    6 Claims

ABSTRACT OF THE DISCLOSURE

A method and compositions for eliminating germinating weed grasses and broadleaf weeds in which a trifluoromethylphenylacetic acid or an amide thereof is the herbicidally active ingredient, particularly useful in corn fields.

CROSS-REFERENCE

The present invention is a continuation-in-part of my copending application, Ser. No. 756,366 filed Aug. 30, 1968, now abandoned, which was in turn a continuation-in-part of my then copending application, Ser. No. 531,041, filed Mar. 2, 1966, now abandoned.

BACKGROUND OF THE INVENTION

Corse et al., J. Am. Chem. Soc., 70, 2837 (1948) teach the preparation of N-(2-hydroxyethyl)-m-trifluoromethylphenylacetamide for use as a penicillin precursor. McGowan, Nature, 200, 1317 (1963), and Hansch and co-workers, Nature, 194, 178 (1962) and J. Am. Chem. Soc. 85, 2817, (1963) discuss the correlation of the biological activity of plant growth regulators with Hammett constants and partition co-efficients. Among the plant growth regulators studied was m-trifluoromethylphenoxyacetic acid. Although this work was based upon the increase in growth of plants at low application rates of the phenoxyacetic acid, it is recognized that most compounds giving a typical auxin response at low concentrations become growth inhibitors at high concentrations. None of the above work, however, involved the actual testing of any phenoxyacetic acid as a herbicide nor was there any indication of selectivity as herbicides for any of the compounds tested. Phenylacetic acids are not mentioned.

It is an object of this invention to provide compositions which are toxic to both grasses and broadleaf weeds in their germinating stage, but which compositions are relatively nontoxic to germinating corn.

SUMMARY

In fulfillment of the above and other objects, this invention provides a novel process and compositions for inhibiting the growth of weed grasses and broadleaf weeds in a field to be seeded to corn comprising the application to an area infested with weed seeds to be seeded to corn a herbicidal amount of a trifluoromethylphenylacetic acid or an amide thereof as represented by the following formula:

wherein

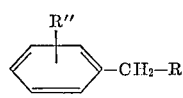

R is $-COOH$ or 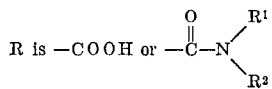

$R^1$ and $R^2$ are the same or different, and are hydrogen, methyl, or β-hydroxyethyl and R" is m-$CF_3$ or o-$CF_3$.

Typical herbicidally active compounds coming within the scope of the above formula include:

m-trifluoromethylphenylacetic acid  
N-methyl-m-trifluoromethylphenylacetamide  
N,N-dimethyl-m-trifluoromethylphenylacetamide  
o-trifluoromethylphenylacetamide  
o-trifluoromethylphenylacetic acid  
N-β-hydroxyethyl-o-trifluoromethylphenylacetamide The novel process of this invention comprises treating a soil area or locus infested with weed grass seeds and broadleaf weed seeds and to be planted to corn with a spray, a dust, or a granular formulation containing a compound coming within the scope of the above formula as the herbicidally active ingredient. Compositions containing the herbicidally active compound are applied by methods well known to the art onto the area to be seeded to corn at the rate of from 0.5 to 20 lb. per acre. For most field applications, it is preferred to spray the herbicidal compositions of this invention at the rate of about 0.5 to about 8 lb. of active ingredient per acre. If, however, the herbicidal compositions are spread in a granular form over the area to be treated, it is preferred to employ a greater amount of active material per acre, suitably in the range of about 5 to 20 lb. of the trifluoromethylphenylacetic acid or derivative thereof.

Seedlings and germinating seeds of many varieties of grasses are killed by the above treatment process, including both undesirable grasses such as the crabgrasses (*Digitaria sanguinalis* and *Digitaria ischaemum*); green and yellow foxtails (*Setaria viridis* and *Setaria lutescens*); goose grass (*Eleusine indica*); sandbur (*Cenchrus pauciflorus*); witchgrass (*Panicum capillare*); and the like. The treatment process had also been found unexpectedly useful in the control of *Abutilon theophrasti* or velvet leaf, *Datura stramonium* or jimsonweed, and *Polygonum pennsylvanicum* or Pennsylvania smartweed. These are plants which have not been readily controlled by previously available herbicidal methods.

The compounds useful in this invention can be prepared in the following manner:

A trifluoromethylphenylacetonitrile is synthesized by allowing a trifluoromethylbenzyl halide to react with sodium or potassium cyanide. The substituted nitrile thus obtained is hydrolyzed under basic conditions to yield a trifluoromethylphenylacetic acid itself. Amides coming within the scope of the above formula are prepared by converting m-trifluoromethylacetic acid to a trifluoromethylphenylacetyl chloride by reaction with thionyl chloride in an inert solvent such as ether, then commingled with ammonia or a primary or secondary amine to yield a trifluoromethylphenylacetamide or N-substituted acetamide.

Alternatively, the trifluoromethylphenylacetic acid may be prepared via the Arndt-Eistert synthesis starting with trifluoromethylbenzoyl chloride.

That the preparation of the useful compounds may be more easily understood, the following examples are provided.

EXAMPLE 1

α-(m-trifluoromethylphenyl)acetamide

To a mixture of 72 g. (1.47 moles) of sodium cyanide, 65 ml. of water, and 185 ml. of alcohol were added with stirring 224 g. (1.15 moles) of m-trifluoromethylbenzyl chloride; and the resulting mixture was refluxed for about 6 hours, during which time the upper layer changed from colorless to almost black. The reaction product mixture was filtered to remove the sodium chloride by product, and the alcoholic filtrate was concentrated in vacuo on the steam bath. Water was added to the black residue, the oily lower layer separated, the aqueous layer extracted with chloroform, and the organic layers were combined, washed with water, and dried. The chloroform solution was distilled through an eight-inch Vigreux column to yield m-trifluoromethylphenylacetonitrile having a boiling point of about 107–109° C. at 11 mm.; $n_D^{25}$=1.4569. Yield: 186.6 g. (87.5 percent of theory).

A mixture of 20.5 g. (0.11 mole) of m-trifluoromethylphenylacetonitrile, 85 g. (1.52 mole) of potassium hydroxide, 500 ml. of water, and 750 ml. of alcohol was refluxed for a period of about 4 hours. The reaction product mixture was concentrated in vacuo to remove the alcohol solvent. The aqueous solution which remained was acidified with aqueous HCl, and the resulting white precipitate was filtered off and washed with water. It was identified as m-trifluoromethylphenylacetic acid having a melting point of about 73–75° C. A sample recrystallized from petroleum ether for analysis had a melting point of about 77–79° C.

To a solution of 20 g. (0.0988 mole) of m-trifluoromethylphenylacetic acid in 100 ml. of ether were added 14 g. (0.118 mole) of thionyl chloride over a period of about 20 minutes with gentle warming. The warming was continued for several hours, and the reaction product mixture was then allowed to stand at room temperature overnight. The reaction product mixture was worked up by removing the ether solvent in vacuo and distilling the residue to yield m-trifluoromethylphenylacetyl chloride having a boiling point of about 93–100° C. at about 18–20 mm. The crude material was used without further purification.

To 5.3 ml. (0.03 mole) of 28 percent concentrated aqueous ammonium hydroxide were added 6 g. (0.027 mole) of m-trifluoromethylphenylacetyl chloride with stirring. The reaction product mixture was then warmed on a steam bath to evaporate part of the excess ammonia, then filtered. The crude solid thus obtained was recrystallized from dilute aqueous ethanol to yield α-(m-trifluoromethylphenyl)acetamide having a melting point of about 106–108° C. Yield: 4.75 g. (86.5 percent of theory).

EXAMPLE 2

α-(m-Trifluoromethylphenyl)-N,N-dimethylacetamide

To 36 g. of a 25 percent aqueous solution of dimethylamine cooled in an ice bath were added 11 g. (0.0495 mole) of m-trifluoromethylphenylacetyl chloride. When the addition was complete, the reaction mixture was heated on a steam bath to evaporate part of the excess dimethylamine. The residual solution was cooled and diluted with ice water; and the crude, oily product was extracted with ether. The ether solution was washed with dilute aqueous sodium hydroxide solution, then with water, dried, and evaporated in vacuo. The crystalline material thus obtained was washed with petroleum ether and then recrystallized from petroleum ether to yield α-(m-trifluoromethylphenyl)-N,N-dimethylacetamide having a melting point of about 58–60° C. Yield: 7.9 g. (63 percent of theory).

EXAMPLE 3

α-(o-Trifluoromethylphenyl)-N,N-dimethylacetamide o-Trifluoromethylphenylacetonitrile was prepared according to the same procedure as in Example 1, but using 30.8 g. (0.125 mole) of o-trifluoromethylbenzyl bromide and 10.2 (0.157 mole) of potassium cyanide as principal reactants in aqueous ethanol solution. The product thus obtained had a melting point of about 31° C. Yield: 23.4 g. (97 percent of theory).

To 6 ml. of absolute methanol contained in a 300-ml. round-bottom flask and cooled in a Dry Ice ethanol bath, 6 g. of anhydrous HCl gas were added. To the methanolic HCl thus obtained were added 22 g. (0.119 mole) of o-trifluoromethylphenylacetonitrile, the nitrile being rinsed in with 10 ml. of dry ether. The reaction mixture was allowed to stand for a few minutes in an ice bath, during which time the contents solidified. The reaction product mixture was placed in a refrigerator overnight and then allowed to warm to room temperature. Ether was then added, and the resulting brown precipitate was filtered off and washed with more ether. The brown precipitate was dried and recrystallized from 200 ml. of hot alcohol-free chloroform, 200 ml. of dry ether being added, and the solution cooled. The crystalline product was filtered off and identified as o-trifluoromethylphenylacetiminomethylether hydrochloride having a melting point of about 154–155.5° C. Yield: 13 g. (44 percent of theory).

A mixture of 3.2 g. of o-trifluoromethylphenylacetiminomethylether hydrochloride and 80 ml. of water was heated on a hot plate for about 20 minutes, and an oily material separated out. Upon cooling, the oil crystallized. The crystalline material was identified as α-(o-trifluoromethylphenyl)acetamide after recrystallization from dilute ethanol. Melting point: 150.5–152° C.

A mixture of 5.4 g. (0.0266 mole) of o-trifluoromethylphenylacetamide and 50 ml. of acetic acid was placed in a 500-ml. three-necked flask equipped with condenser, mechanical stirrer, thermometer, and separatory funnel. Dry HCl was passed into the mixture for 15 minutes. A total of 5.4 g. of n-butylnitrite, previously distilled, was added dropwise over a period of 50 minutes. The reaction mixture became deep red in color and colored fumes were evolved. Stirring was continued for about 2 hours at room temperature after the addition was completed, and the mixture was then warmed to a temperature of about 60–63° C. for about 6 hours. The reaction product mixture was worked up by distilling the acetic acid in vacuo and adding petroleum ether to the oily residue. The solid which separated was filtered off and was recrystallized from petroleum ether to yield o-trifluoromethylphenylacetic acid having a melting point of about 102.5–103° C.

To 26 g. of a 25-percent aqueous solution of dimethylamine cooled in an ice bath were added 8.1 g. (0.0365 mole) of o-trifluoromethylphenylacetyl chloride (prepared from o-trifluoromethylphenylacetic acid and thionyl chloride). When the addition was complete, the reaction product mixture was heated on a steam bath for about 10 minutes and then warmed under vacuum to remove the excess dimethylamine. The residual material crystallized when cooled in an ice bath. The crystalline solid was recrystallized from a mixture of ether and petroleum ether to yield α-(o-trifluoromethylphenyl)-N,N-dimethylacetamide having a melting point of about 40–41.5° C. Yield: 3.85 g. (46 percent of theory).

The trifluoromethylphenylacetic acids and their amides are formulated for use as pre-emergent selective herbicides, either as dusts, spray concentrates, spreadable granules, or wettable powders. The compounds are quite insoluble in water and, for the preparation of emulsion type sprays or wettable powders, are formulated with a wetting agent or surfactant. The wetting agent or surfactant used in formulating the emulsion-type sprays or wettable powders can be illustratively polyoxyethylene sorbitan mono-laurate, polyoxyethylene sorbitan mono-oleate, polyglycolether sulfonates, alkylamine dodecylbenzenesulfonates, nonylphenolpolyoxyethylene ethers and the like. In the preparation of spreadable granules, the inert solid diluent used can be calcined attapulgite clay. Dispersions can be prepared on herbicidally inert carriers such as vermiculite, peat moss, and the like.

A number of the herbicidal methods and compositions of the present invention are illustrated by the following specific examples.

EXAMPLE 4

The following experimental procedure was used to demonstrate the efficacy of the compositions of this invention in killing germinating weeds without affecting the germination of corn.

A soil was prepared consisting of one part masonry sand and one part shredded top soil blended together in a cement mixer and placed in a 25 x 35 cm. galvanized flat and was patted down with a bench brush until level. The flat contains bottom holes and grooves for drainage. The following quantities of seeds were planted in flats thus prepared in rows perpendicular to the long axis of the flat: 100–150 large crabgrass seeds (*Digitaria sanguinalis*); 150–250 redroot pigweed seeds (*Amaranthus retroflexus*), 40–50 velvet leaf seeds (*Abutilon theophrasti*), 80–100 foxtail millet seeds (*Setaria italica*), 80–100 mustard seeds (*Brassica juncea*), 40–50 jimsonweed seeds (*Datura stramonium*), and 4 corn kernels. After planting, sufficient soil was added to cover the entire flat. The flats were planted the day prior to treatment and fertilized after planting by applying to each flat one pint of a fertilizer solution containing 2.5 grams of a soluble 23–19–17 fertilizer.

In assaying the effect of the compositions as pre-emergent herbicides, a flat prepared as above was placed in a chamber equipped with a turntable and an air exhaust. The herbicidal composition, whether it was a spray-type emulsion or a wettable powder was applied to the flat with a modified DeVilbiss atomizer hooked to an air source. Twelve and one-half milliliters of the composition under test were applied to each flat on the day after planting. Injury ratings and observations as to type of injury were made eleven to thirteen days after treatment.

The injury rating scale used was as follows:

0 ------------------------------- No injury.
1 ------------------------------- Slight injury.
2 ------------------------------- Moderate injury.
3 ------------------------------- Severe injury.
4 ------------------------------- Death.

When more than one determination was carried out, an average value was calculated for the injury rating.

The table which follows sets forth the results of preemergent testing of trifluoromethylphenylacetic acids or derivatives thereof coming within the scope of the above formula. In the table, column 1 gives the name of the compound; column 2, the rate in terms of pounds per acre at which the compound was applied to the test flat; and columns 3 to 9, the injury rating for the particular plant seeds or seedlings.

EXAMPE 5

Further testing of one compound, m-trifluoromethylphenylacetic acid, was carried out in the field to further demonstrate the efficacy of a composition of this invention in controlling weeds such as giant foxtail (*Setaria faberii*), large crabgrass (*Digitaria sanguinalis*), redroot pigweed (*Amaranthus retroflexus*), and purslane (*Portulaca oleracea*). The emulsifiable liquid concentrate formulation for use in this trial was prepared by mixing 24 g. of m-trifluoromethylphenylacetic acid with 6.5 g. of an emulsifying agent containing 1 part of an alkylarylsulfonate and 2 parts of a mixture of a magnesium salt of a cetylphenolsulfonic acid and a mono- and di-resin acid ester of a polyoxyethylene glycol M.W.=400, and diluting the resulting mixture to a volume of 100 ml. with xylene. The resulting emulsifiable liquid concentrate contained 2 pounds of the acid per gallon. In assaying the effect of the composition as a preemergent herbicide under conditions simulating actual use in the field, each of the test plots was first cultivated and smoothed. The herbicidally-active compositions were applied to individual plots by two different methods, surface spray (SS in Table II to follow), and preplant soil incorporation (PPI in Table II). In the former, the composition was simply sprayed on the surface of the soil at the desired rate of application just after the planting of selected crop and weed seeds. In the latter method, the herbicidal composition was sprayed on the surface of the soil and then incorporated into the top two-inch layer of soil by roto-tilling, after which operation the seeding was done as usual. Examination of the plots and determination of weed control ratings was made about twenty-four to twenty-seven days after treatment. The control of weeds was rated on a scale of from 0 to 10, 0 being zero percent control and 10 being 100 percent control.

Table II, which follows, sets forth the results. In the table, column 1 gives the name of the compound; column 2, the rate of application in terms of pounds per acre; and columns 3 to 6, the weed control rating for the method of application to the particular type of weed.

TABEL II

| Compound | Rate (lb./A.) | Grasses[a] | | Broadleaves[b] | |
|---|---|---|---|---|---|
| | | SS | PPI | SS | PPI |
| m-Trifluoromethylphenyl- acetic acid | 8 | 8.0 | 8.5 | 9.0 | 9.0 |
| | 4 | 2.5 | 2.0 | 6.5 | 5.0 |
| | 2 | 0 | 0 | 3.5 | 2.5 |
| | 1 | 0 | 0 | 0 | 0 |
| Control | | 0 | 0 | 0 | 0 |

[a] Giant foxtail, large crabgrass.
[b] Redroot pigweed, purslane.

TABLE I
Injury Rating on Preemergent Treatment

| Compound | Lb./acre | Corn | Large crabgrass | Mustard | Pigweed | Foxtail | Velvet leaf | Jimsonweed |
|---|---|---|---|---|---|---|---|---|
| N-β-hydroxyethyl-m-trifluoromethylphenyl acetamide | 8 | 1.7 | 3 | 3.2 | 4 | 3.5 | 3 | 4 |
| | 4 | 1.0 | 3 | 3.3 | 3 | 3.0 | 2 | 4 |
| | 2 | 0 | 2.7 | 2.8 | 2.7 | 2.7 | 0 | 1 |
| | 1 | 1.0 | 3 | 2.3 | 2 | 2 | 0 | 0 |
| m-Trifluoromethylphenylacetic acid | 8 | 2 | 3 | 4 | 3 | 3 | | |
| | 4 | 2 | 3 | 4 | 3 | 3 | 4 | 4 |
| | 2 | 1 | 3 | 3.5 | 2 | 3 | 3 | 4 |
| m-Trifluoromethylphenyl acetamide | 8 | 3 | 3.5 | 4 | 4 | 3 | 3 | 4 |
| | 4 | 2 | 3 | 3.5 | 4 | 3 | 2 | 4 |
| | 2 | .5 | 2.5 | 2.7 | 3.5 | 2 | 1 | 3 |
| | 1 | 0 | 1 | 2.5 | 2 | 2 | 0 | 1 |
| | .5 | 0 | 1 | 2 | 1 | 1 | | |
| N,N-dimethyl-m-trifluoromethylphenyl acetamide | 8 | 2 | 4 | 4 | 4 | 4 | 2 | 2 |
| | 4 | 0 | 3 | 3 | 3 | 3 | 0 | 0 |
| | 2 | 0 | 1 | 2 | 2 | 1 | | |
| o-Trifluoromethylphenyl acetamide | 8 | 1 | 3.5 | 3.5 | 3.5 | 3.0 | 2.0 | 3.0 |
| | 4 | 1 | 3 | 3 | 4 | 3.0 | 1.0 | 2.0 |
| | 2 | 0 | 3 | 3 | 2 | 2.0 | 2.0 | 1.0 |

As is well understood in the art, the rates of application of herbicide required to produce a given result under the carefully controlled conditions of the greenhouse can be from a half to a fourth those required in the field.

EXAMPLE 6

Another field trial was carried out to evaluate m-trifluoromethylphenylacetic acid as a preemergence weed control agent in a cornfield. In this evaluation, a field was prepared in routine fashion, seeded with a mixture of the seeds of four weeds using a cyclone seeder and the weed seeds disked into the soil to insure satisfactory infestation with weeds. The field was then divided into plots measuring 30 inches by 8 feet and each plot was planted to one row of corn (Funks G-75A). In this evaluation, the test compound, as an emulsifiable liquid concentrate containing 2 pounds per gallon, was applied as a surface spray (SS in Table III which follows) immediately after the seeding. After 24 days, readings were made of the degree of weed control achieved and, at the same time, any injury to the corn estimated.

The results of the evaluation are set forth in the following Table III, where column 1 lists the name of the test compound; column 2, the rate which the test compound was applied; columns 3 and 4, the percent weed control; and column 5, the injury ratings of the corn.

TABLE III

| Compound | Rate (lb./A.) | Percent weed control [a] | | Injury rating, corn [b] |
|---|---|---|---|---|
| | | Grasses [c] | Broadleaves [d] | |
| m-Trifluoromethyl-phenylacetic acid | 4.0 SS | 83.7 | 85.5 | 1.0 |
| | 2.0 SS | 65.9 | 71.5 | 0 |
| | 1.0 SS | 68.7 | 50.0 | 0 |
| | 0.5 SS | 64.0 | 53.7 | 0 |
| Control | 0 | 0 | 0 | 0 |

[a] Percent control based upon number of weeds per 5 square feet.
[b] Injury rating scale 0-10: 0=no injury; 1-3=slight; 4-6=moderate; 7-9=severe; 10=death.
[c] 60 percent giant foxtail, 40 percent large crabgrass.
[d] 30 percent pigweed, 70 percent purslane.

I claim:

1. A method of inhibiting the growth of weed grasses and broadleaf weeds in an area to be seeded to corn and infested with weed seeds which comprises applying to said area a herbicidal quantity of a compound of the structure:

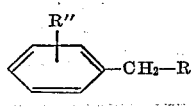

wherein

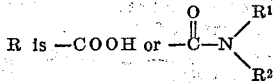

$R^1$ and $R^2$ are the same or different, and are hydrogen, methyl, or $\beta$-hydroxyethyl and R" is m-CF$_3$ or o-CF$_3$.

2. A method as in claim 1 wherein said compound is m-trifluoromethylphenylacetic acid.

3. A method as in claim 1 wherein said compound is m-trifluoromethylphenylacetamide.

4. A method as in claim 1 wherein said compound is N-(2-hydroxyethyl)-m-trifluoromethylphenylacetamide.

5. A method as in claim 1 wherein said compound is employed at a rate of from about 0.5 to about 20 lb. per acre.

6. A method as in claim 1 wherein said compound is employed at a rate of from about 0.5 to about 8 lb. per acre.

References Cited

UNITED STATES PATENTS

| 2,412,510 | 12/1946 | Jones | 71—118 |
| 3,009,806 | 11/1961 | Weil et al. | 71—115 |
| 2,444,905 | 7/1948 | Sexton | 71—115 |

FOREIGN PATENTS

| 19,200 | 8/1965 | Japan | 71—118 |

OTHER REFERENCES

Hansch et al., Nature, vol. 194 (1962), pp. 178–180.
Hansch et al., J. Am. Chem. Soc., vol. 85 (1963), pp. 2817–2824.
McGowan, Nature, vol. 200 (1963), p. 1317.
Thompson, "Agricultural Chemicals, Book 11, Herbicides, p. 7.

LEWIS GOTTS, Primary Examiner
C. L. MILLS, Assistant Examiner

U.S. Cl. X.R.

71—118; 260—465 G, 515 A, 544 M, 558 R